(12) United States Patent
Jeong

(10) Patent No.: US 8,723,377 B2
(45) Date of Patent: May 13, 2014

(54) LINEAR VIBRATOR HAVING EXPOSURE HOLE OR GROOVE IN THE COVER

(75) Inventor: Seung Hyeon Jeong, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 205 days.

(21) Appl. No.: 13/328,526

(22) Filed: Dec. 16, 2011

(65) Prior Publication Data

US 2013/0069452 A1 Mar. 21, 2013

(30) Foreign Application Priority Data

Sep. 20, 2011 (KR) ........................ 10-2011-0094435

(51) Int. Cl.
*H02K 33/00* (2006.01)
*H02K 41/03* (2006.01)
*H02K 35/00* (2006.01)

(52) U.S. Cl.
USPC .......................................................... 310/15

(58) Field of Classification Search
CPC ............................... H02K 33/16; H02K 35/06
USPC ................................ 310/15, 12.16, 25, 71, 81
See application file for complete search history.

(56) References Cited

U.S. PATENT DOCUMENTS

| | | | |
|---|---|---|---|
| 2005/0184601 A1 | 8/2005 | Kweon et al. | |
| 2005/0225181 A1* | 10/2005 | Tu et al. | 310/12 |
| 2008/0265691 A1* | 10/2008 | Shikayama et al. | 310/12 |
| 2011/0068641 A1* | 3/2011 | Choi et al. | 310/25 |
| 2011/0133578 A1* | 6/2011 | Choi | 310/25 |
| 2011/0227426 A1* | 9/2011 | Lee et al. | 310/25 |
| 2011/0309692 A1* | 12/2011 | Park | 310/25 |

FOREIGN PATENT DOCUMENTS

| | | | |
|---|---|---|---|
| JP | 2009-166016 | 7/2009 | |
| KR | 10-2005-0083528 | 8/2005 | |
| KR | 100923867 | * 10/2009 | ............ H02K 33/04 |
| KR | 10-0933179 B1 | 12/2009 | |
| KR | 10-1046003 B1 | 7/2011 | |
| KR | 10-1046044 B1 | 7/2011 | |
| KR | 10-0933179 B1 | 8/2011 | |

OTHER PUBLICATIONS

Machine translation of KR100923867, Kim, Oct. 2009.*
Korean Office Action, w/ English translation thereof, issued in Korean Patent Application No. 10-2011-0094435, dated Jan. 12, 2012.

* cited by examiner

*Primary Examiner* — Terrance Kenerly
(74) *Attorney, Agent, or Firm* — McDermott Will & Emery LLP

(57) ABSTRACT

A linear vibrator includes a fixed part providing an interior space having a predetermined size; at least one magnet disposed in the interior space and generating magnetic force; a vibration part including a coil facing the magnet and generating electromagnetic force through interaction with the magnet and a mass body; and a substrate having one end coupled to the vibration part to thereby serve as a free end, and the other end including a copper foil pattern portion coupled to the fixed part to thereby serve as a fixed end. The fixed part includes an exposure hole penetrating a top and bottom surface thereof or an exposure groove recessed from an outer end of the fixed part. The exposure hole or groove is formed on the protrusion portion. The copper foil pattern portion is coupled with a part of the protrusion portion defining the exposure hole or groove.

5 Claims, 6 Drawing Sheets

# LINEAR VIBRATOR HAVING EXPOSURE HOLE OR GROOVE IN THE COVER

CROSS-REFERENCE TO RELATED APPLICATIONS

This application claims the priority of Korean Patent Application No. 10-2011-0094435 filed on Sep. 20, 2011, in the Korean Intellectual Property Office, the disclosure of which is incorporated herein by reference.

BACKGROUND OF THE INVENTION

1. Field of the Invention

The present invention relates to a linear vibrator, and more particularly, to a linear vibrator capable of generating vibrations when mounted in a portable electronic device.

2. Description of the Related Art

Recently, the release of personal portable terminals having large LCD screens provided for user convenience has significantly increased. Accordingly, a touch screen scheme has been adopted therein, and a vibration motor has been used so as to generate vibrations when a touch is applied to a touch screen.

The vibration motor converts electrical energy into mechanical vibrations using a principle of generating electromagnetic force, and is mounted in the personal portable terminal to be used for silent incoming signal notification.

In the related art, a method in which a rotation part of an unbalanced mass is rotated by generating rotational force to thereby obtain mechanical vibrations has been used, and the rotational force is subjected to a rectifying action via a contact point between a brush and a commutator to thereby obtain the mechanical vibrations.

However, a brush-type structure using the commutator may cause mechanical friction and electrical sparks as well as the generation of foreign objects when the brush passes through a clearance between segments of the commutator when the motor is rotated, so that the service life of the motor may be shortened.

In addition, since it takes time to reach an amount of target vibrations due to rotational inertia when voltage is applied to the motor, there may be a problem in which a sufficient amount of vibrations for the touch screen may not be implemented.

A linear vibrator is widely used to implement a vibration function in the touch screen, while overcoming disadvantages in the service life and response properties of the motor.

The linear vibrator does not use a motor rotation principle, but generates resonance by periodically generating, in accordance with resonant frequencies, electromagnetic force obtained through a spring installed inside the linear vibrator and a mass body suspended thereon, thereby generating vibrations.

The linear vibrator can be slimmer and more effectively produced to meet market trends for compact and slim-type portable electronic devices, and there should be no influence on the performance and characteristics of the vibrator even in the case that several factors act thereupon.

However, a linear vibrator according to the related art have a problem in that the performance and characteristics thereof are changed by components that vibrate in an interior space of the linear vibrator, and this may eventually affect the portable electronic device adopting the above-described linear vibrator.

Accordingly, there is an urgent need for research that may help to prevent the performance and characteristics of the vibrator from being changed by components that vibrate in the interior space of the linear vibrator.

SUMMARY OF THE INVENTION

An aspect of the present invention is to provide a linear vibrator having compactness and slimness by changing the structure of a coil generating electromagnetic force for vibrations and a magnet, while preventing the performance and characteristics thereof from being degraded by a vibrating component.

According to an aspect of the present invention, there is provided a linear vibrator, including: a fixed part providing an interior space having a predetermined size; at least one magnet disposed in the interior space and generating magnetic force; a vibration part including a coil facing the magnet and generating electromagnetic force through interaction with the magnet and a mass body; and a substrate having one end coupled to the vibration part to thereby serve as a free end, and the other end including a copper foil pattern portion coupled to the fixed part to thereby serve as a fixed end.

The copper foil pattern portion may be formed on a surface of the substrate with which the fixed part is brought into contact.

The copper foil pattern portion and the fixed part may be coupled by at least one of soldering, welding, and bonding.

The fixed part may include an exposure hole penetrating a top surface and a bottom surface thereof in order to allow the copper foil pattern portion to be exposed to the outside.

The fixed part may include an exposure groove recessed from an outer end of the fixed part in order to allow the copper foil pattern portion to be exposed to the outside.

The copper foil pattern portion may be coupled with a part of the fixed part defining the exposure hole or the exposure groove, by soldering.

The fixed part may include a case providing the interior space and having an open bottom, and a bracket sealing the interior space and having a protrusion portion protruding outwardly of the case. The exposure hole or the exposure groove may be formed on the protrusion portion. The copper foil pattern portion may be coupled with a part of the protrusion portion defining the exposure hole or the exposure groove by soldering.

The fixed part may include a case providing the interior space and having an open bottom, and a bracket sealing the interior space, and the magnet may be coupled to a surface of the bracket or a surface of the case.

The fixed part may include a case providing the interior space and having an open bottom, and a bracket sealing the interior space, and the magnet may include a plurality of magnets respectively coupled to a surface of the bracket and a surface of the case.

The linear vibrator may further include a yoke plate formed on at least one surface of the magnet and allowing magnetic flux to smoothly flow to the magnet through the coil.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
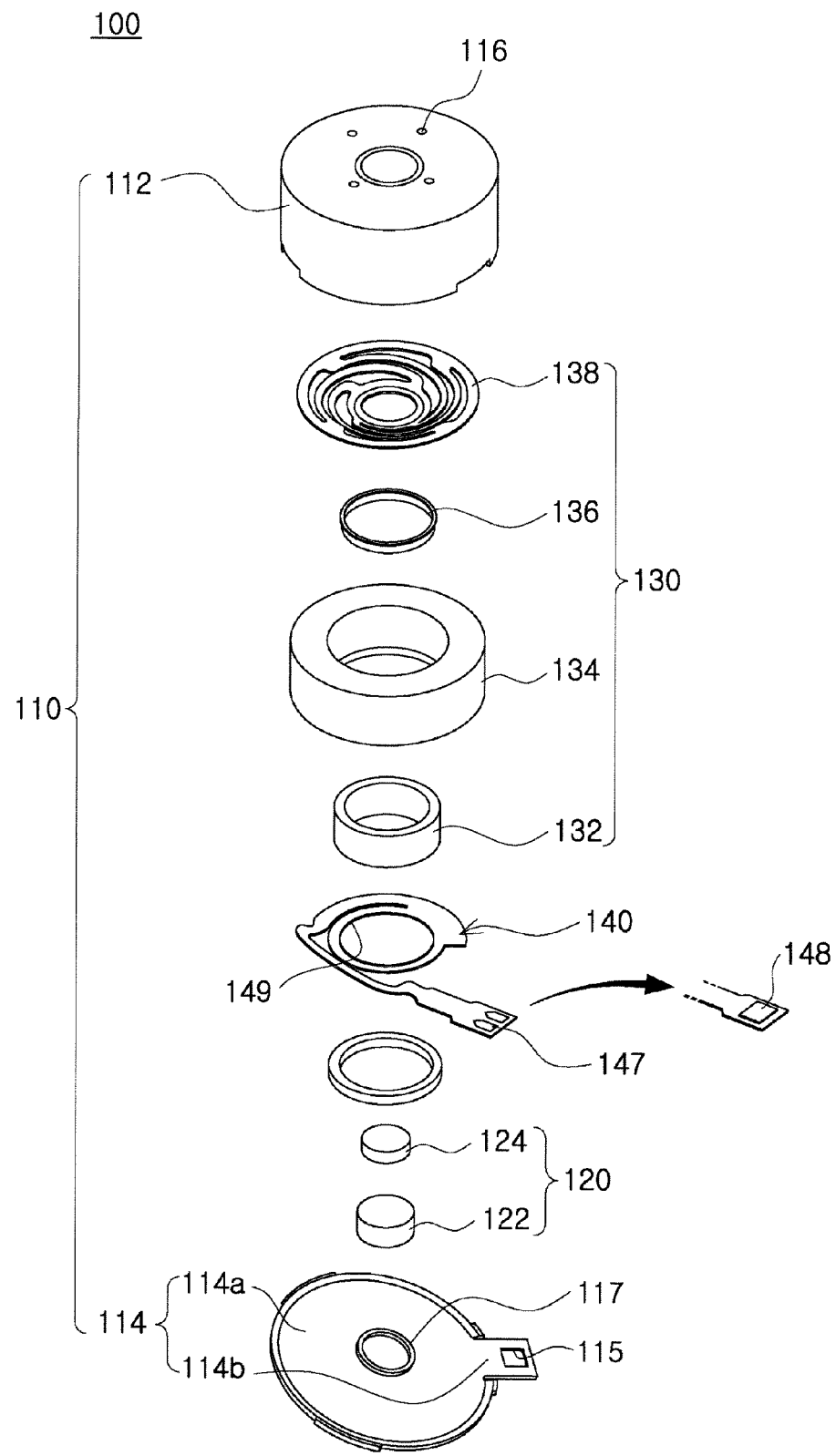
FIG. 1 is a schematic exploded perspective view illustrating a linear vibrator according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are to be construed as being included in the spirit of the present invention.

Further, like reference numerals will be used to designate like components having similar functions throughout the drawings within the scope of the present invention.

Figure 2:
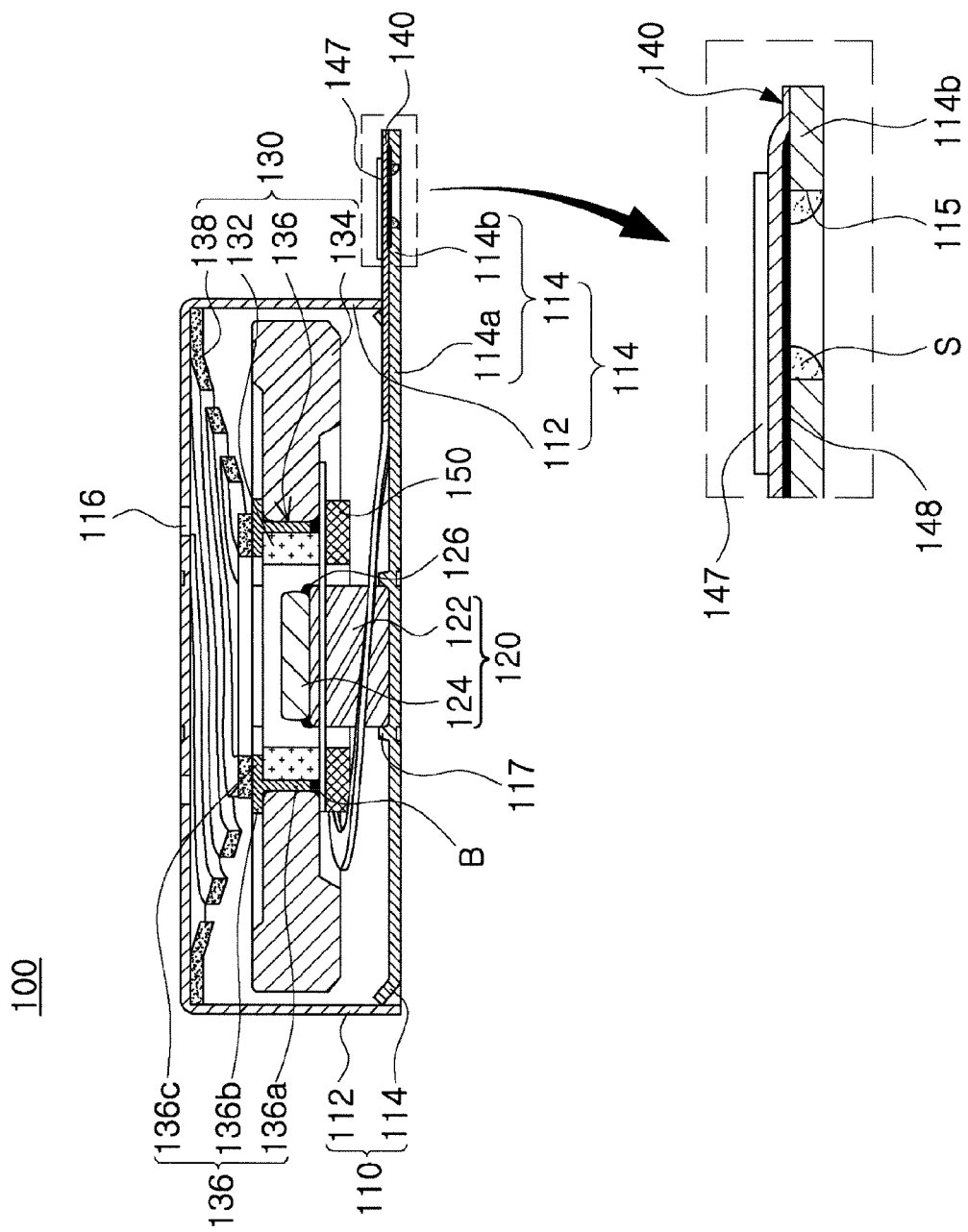
FIG. 2 is a schematic cross-sectional view illustrating a linear vibrator according to an embodiment of the present invention.
Figure 3:
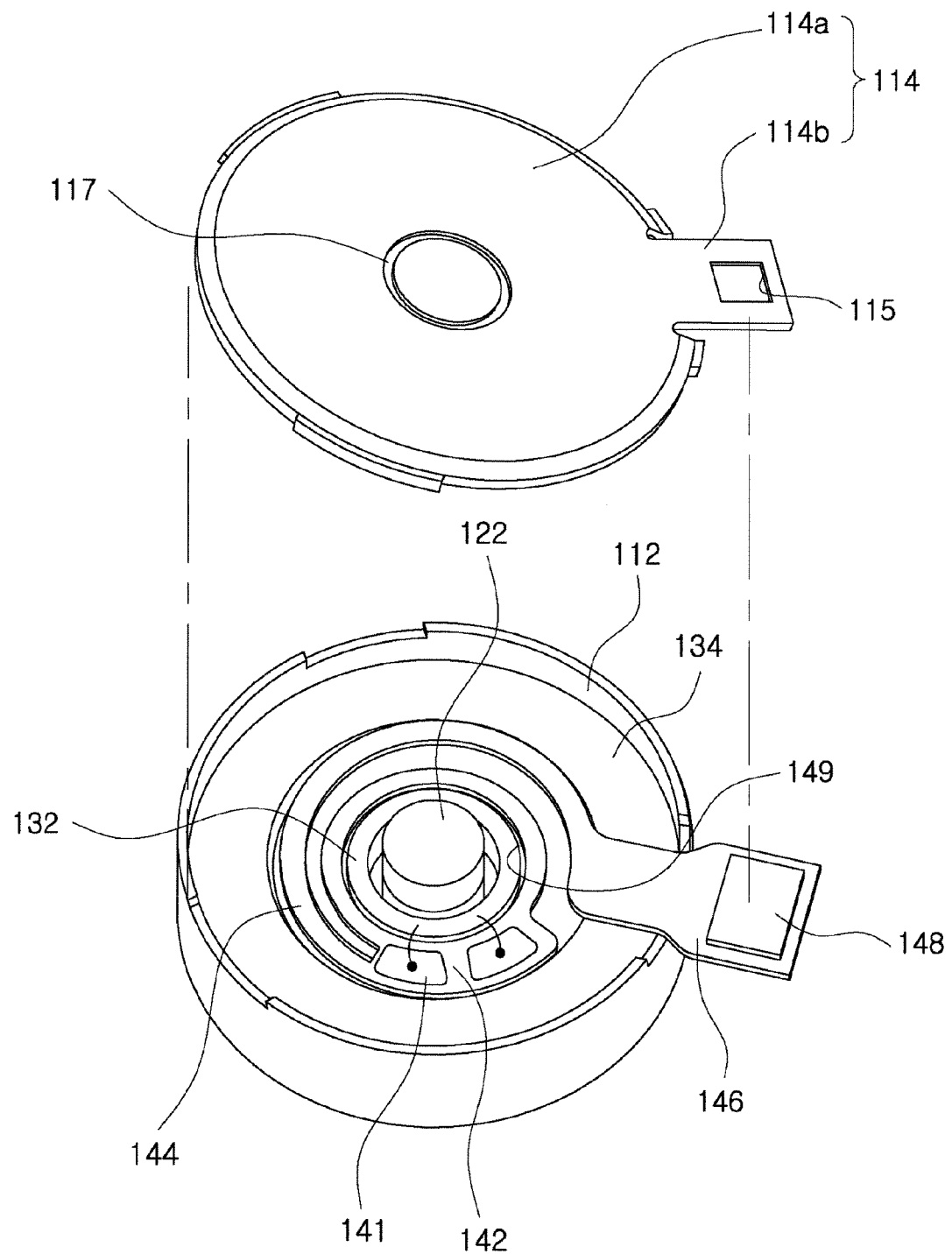
FIG. 3 is a schematic exploded perspective view illustrating disassembling of a bracket provided to a linear vibrator according to an embodiment of the present invention.
Figure 4:
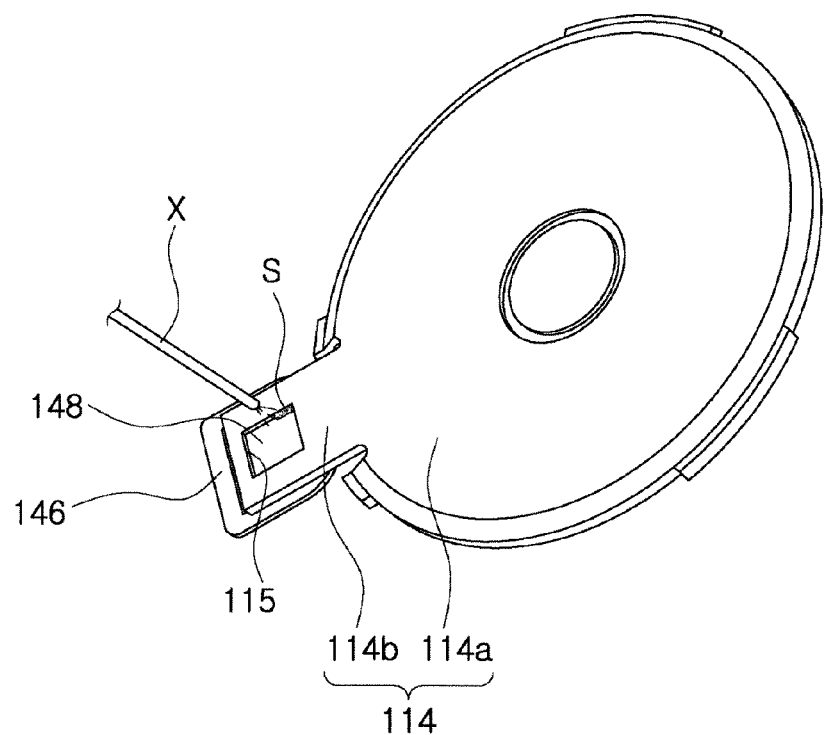
FIG. 4 is a schematic perspective view illustrating an assembling process between a bracket and a substrate provided to a linear vibrator according to an embodiment of the present invention.

FIG. 1 is a schematic exploded perspective view illustrating a linear vibrator according to an embodiment of the present invention, FIG. 2 is a schematic cross-sectional view illustrating a linear vibrator according to an embodiment of the present invention, FIG. 3 is a schematic exploded perspective view illustrating disassembling of a bracket provided to a linear vibrator according to an embodiment of the present invention, and FIG. 4 is a schematic perspective view illustrating an assembling process between a bracket and a substrate provided to a linear vibrator according to an embodiment of the present invention.

First, in defining directional terms, an outer radial direction or an inner radial direction may be a direction from the center of a case 112 toward an outer circumferential surface thereof, or vice versa.

Referring to FIGS. 1 through 4, a linear vibrator 100 according to an embodiment of the present invention may include a fixed part 110 forming the exterior of the linear vibrator 100, a magnet 122 of a magnetic field part 120, a vibration part 130 including a coil 132 and a mass body 134, and a substrate 140.

The fixed part 110 may provide an interior space having a predetermined size, and specifically, may include the case 112 having an open bottom and a bracket 114 sealing the interior space formed by the case 112.

Here, the case 112 and the bracket 114 may form the space accommodating the magnetic field part 120 including the magnet 122, the vibration part 130, and the like may be formed by the case 112 and the bracket 114. The case 112 and the bracket 114 may be integrally formed.

In addition, in a top surface of the case 112, at least one inflow hole 116 for disposing a magnetic fluid 126, which will be described later, on an outer circumferential surface of the magnet 122 may be formed, and the outer circumferential surface of the magnet 122 may be easily coated with the magnetic fluid 126 through the inflow hole 116.

In addition, the inflow hole 116 may allow a laser beam to penetrate therethrough, which is required when an elastic member 138 and a holder 136 of the vibration part 130 are coupled by welding.

Here, the bracket 114 may include a sealing portion 114a sealing the open bottom of the case 112, and a protrusion portion 114b protruding outwardly of the case 112 after being coupled therewith.

The protrusion portion 114b may include an exposure hole 115 penetrating a top surface and a bottom surface thereof, for soldering coupling with a copper foil pattern portion 148 formed on the substrate 140.

When the substrate 140 and the protrusion portion 114b are brought into contact with each other, the exposure hole 115 may expose, to the outside, the copper foil pattern portion 148 formed on the substrate 140, so that the copper foil pattern portion 148 and the protrusion portion 114b are coupled by solder (S) using a soldering tool X.

As described above, the coupling relationship between the substrate 140 including the copper foil pattern portion 148 and the bracket 114 including the protrusion portion 114b will be described in detail later.

The magnet 122 and a yoke plate 125 may constitute the magnetic field part 120 of the linear vibrator 100 according to the embodiment of the present invention, and the magnet 122 may be coupled to the top surface of the bracket 114 constituting the fixed part 110 by at least one of bonding, pressing, and welding.

The magnet 122 may have an outer diameter smaller than an inner diameter of the coil 132 coupled to the holder 136, and may be coupled to the bracket 114 to act as a fixed member.

However, an outer wall 117 that is protruded to correspond to the outer diameter of the magnet 122 may be provided on the top surface of the bracket 114, and the outer circumferential surface of the magnet 122 is inserted and fixed to an inner surface of the outer wall 117, so that the magnet 122 and the bracket 114 may be more tightly coupled.

Here, the top surface of the magnet 122 may be coupled to the yoke plate 124 allowing magnetic flux to smoothly flow to the magnet 122 through the coil 132 generating electromagnetic force by interaction with the magnet 122.

The yoke plate 124 may be formed of a magnetic material, thereby facilitating coating of the magnetic fluid 126.

That is, the magnetic fluid 126 may be coated between the outer circumferential surfaces of the magnet 122 and the yoke plate 124 and the coil 132, and the magnetic fluid 126 may prevent abnormal vibrations of the vibration part 130.

Specifically, the magnetic fluid 126 may be disposed in a clearance formed between the magnet 122 and the coil 132 so as to facilitate a vertical movement of the vibration part 130, and may prevent the abnormal vibrations generated by the lateral or vertical movement of the vibration part 130 due to factors such as an external impact, and the like.

The magnetic fluid 126 may be a substance which converges at the magnetic flux of the magnet 122, and when the surface of the magnet 122 is coated with the magnetic fluid 126, the magnetic fluid 126 may converge at a generation point of the magnetic flux of the magnet 122 to thereby form a single ring.

Here, the magnetic fluid 126 may be obtained such that a magnetic powder is dispersed in a liquid in a colloidal state, and then a surfactant is added thereto, so that precipitation or agglomeration of the magnetic powder due to gravity, a magnetic field, or the like, may not occur. As examples of the magnetic fluid 126, trilead tetraoxide and iron-cobalt alloy particles are dispersed in oil or water, or cobalt is dispersed in toluene.

The magnetic powder may be ultra-fine powder, and allow for a unique Brownian motion of ultra-fine particles, so that a concentration of magnetic powder particles in the fluid may be maintained to be constant, even in the case of the application of an external magnetic field, gravity, centrifugal force, or the like.

In addition, the magnetic fluid 126 may fill a gap between an outer surface of the magnet 122 and an inner surface of a hollow of the coil 132, so that the vibration part 130 may vibrate smoothly or slide.

The vibration part 130 may include the coil 132 and the mass body 134, and the coil 132 and the mass body 134 may be fixed by the holder 136, and mediation of the vibration may be implemented by the elastic member 138.

That is, the vibration part 130 may be a member that vibrates vertically via the elastic member 138.

The coil 132 may be disposed to face the magnet 122, and a part of the magnet 122 may be inserted into a space formed by the coil 132.

Here, the coil 132 may have an inner diameter larger than an outer diameter of the magnet 122, and the coil 132 and the magnet 122 may be maintained in a non-contact state while the vibration part 130 moves.

In addition, the coil 132 may be coupled to an inner surface of a hollow of the holder 136, and induce a magnetic field therearound when a current is applied thereto in accordance to a predetermined frequency.

Here, when electromagnetic force is obtained through the coil 132, magnetic flux passing through the coil 132 from the magnet 122 may be formed in a lateral direction, and the magnetic field generated by the coil 132 may be formed in a vertical direction, so that the vibration part 130 may vibrate vertically.

Accordingly, the magnetic flux direction of the magnet 122 and the vibration direction of the vibration part 130 may be perpendicular to each other.

That is, through the application of the electromagnetic force having the same vibrational frequency as a natural mechanical frequency of vibrations of the vibration part 130, the vibration part 130 may resonate and vibrate to obtain a maximum vibrational quantity, and the natural frequency of vibrations of the vibration part 130 may be affected by a mass of the vibration part 130 and an elastic coefficient of the elastic member 138.

Here, current applied to the coil 132 of the vibration part 130, that is, external power having a predetermined frequency, may be supplied by the substrate 140 coupled to the vibration part 130, which will later be described.

The holder 136 may be coupled to an outer circumferential surface of the coil 132 to fixedly support the mass body 134, and may be formed to have a hollow cylindrical shape having open top and bottom.

Specifically, the holder 136 may include a cylindrical vertical portion 136a contacting one surface of each of the coil 132 and the mass body 134, and outer and inner horizontal portions 136b and 136c, respectively extended from an end of the vertical portion 136a in the outer and inner radial directions to thereby support the other surface of each of the coil 132 and the mass body 134.

An outer circumferential surface of the vertical portion 136a and a bottom surface of the outer horizontal portion 136b are brought into contact with the mass body 134 to thereby fixedly support the mass body 134, and an inner circumferential surface of the vertical portion 136a and a bottom surface of the inner horizontal portion 136c may fixedly support the coil 132.

In addition, the holder 136 may be formed of a material including iron, and formed of the same material as that of the elastic member 138 to thereby allow for tight coupling to easily be performed.

However, the material of the holder 136 and the elastic member 138 is not limited thereto, and any material may be used as long as the coupling may be easily and tightly performed.

In addition, the vertical portion 136a of the holder 136 may be formed to be higher than a bottom surface of each of the coil 132 and the mass body 134 so as to form a space therebetween, and the space may be filled with an adhesive (B), so that the coupling between the coil 132 and the mass body 134 may be more tightly performed.

The mass body 134 may be a vibration body that is coupled to the outer surface of the vertical portion 136a and the bottom surface of the outer horizontal portion 136b of the holder 136 to vibrate vertically. Here, when the mass body 134 vibrates vertically, the mass body 134 may have an outer diameter smaller than an inner diameter of the inner surface of the case 112, so as to allow for vibrations without contact within the fixed part 110.

Thus, a clearance having a predetermined size may be formed between the inner surface of the case 112 and the outer surface of the mass body 134.

The mass body 134 may be formed of a nonmagnetic material or a paramagnetic material which is not affected by a magnetic force generated by the magnet 122.

Accordingly, the mass body 134 may be formed of a material such as tungsten having a denser mass than that of steel, and this is because a resonance frequency is adjusted by increasing the mass of the vibration part 130 within the same volume, and a vibration quantity is maximized.

However, the material of the mass body 134 is not limited to tungsten, and various materials may be used therefor, depending on the designer's intent.

Here, to correct a natural frequency of vibrations in the linear vibrator 100, the mass body 134 may have a space in which a sub mass body is additionally inserted, thereby adding and subtracting the mass of the mass body 134.

The elastic member 138 may be coupled to the holder 136 and the case 112 to provide elastic force as described above, and affect the natural vibrational frequency of the vibration part 130 by the elastic coefficient of the elastic member 138.

Here, the elastic member 138 may be one of a coil spring and a plate spring; however, without being limited thereto, any member may be used, as long as it can provide elastic force.

The substrate 140 may be coupled to one surface of the mass body 134 constituting the vibration part 130, and may include a through hole 149, through which the magnet 122 passes, so that the substrate 140 and the magnet 122 are in a non-contact state when the vibration part 130 vibrates.

That is, the through hole 149 may prevent contact between the magnet 122 and the substrate 140, and allow for a maximal vibration quantity in the vibration part 130 without being limited by amplitude at the time of vibration and movement of the vibration part 130.

Accordingly, the linear vibrator 100 according to the embodiment of the present invention may obtain more stable linear vibrations through the inclusion of the through hole 149.

Specifically, one end of the substrate 140 may be coupled to the vibration part 130 to serve as a free end thereof. Also, the other end thereof may include the copper foil pattern portion 148, and the copper foil pattern portion 148 and the fixed part 110 may be coupled to serve as a fixed end.

More specifically, the substrate 140 may be a flexible printed circuit board, and include a moving piece 142 coupled with the mass body 134 of the vibration part 130, a fixed piece 146 coupled with the fixed part 110, and a connection piece 144 connecting the moving piece 142 and the fixed piece 146 to each other.

The moving piece 142 may be a free end linked with the vibration part 130 to vibrate, and a top surface of the moving piece 142 and a bottom surface of the coil 132 are brought into contact with each other to be coupled.

An interior space formed by the moving piece 142 may denote the through hole 149 which has been previously described.

Here, in order that the moving piece 142 is coupled with the mass body 134, the bottom surface of the mass body 134 may include a region that is upwardly recessed to be coupled to the moving piece 142.

Accordingly, the moving piece 142 may be coupled to the region; however, the moving piece 142 may be directly coupled to a flat bottom surface of the mass body 134 without the region. Here, a power connection terminal 147 for supplying power to the coil 132 may be provided on the top surface of the fixed piece 146, and may be protruded to the outside of the case 112.

In addition, the copper foil pattern portion 148 for coupling with the fixed part 110 may be provided on the bottom surface of the fixed piece 146, and the copper foil pattern portion 148 may be a thin copper plate.

More specifically, the copper foil pattern portion 148 may be provided on one surface of the substrate 140 on which the substrate 140 and the fixed part 110 contact, that is, on the bottom surface of the fixed piece 146 of the substrate 140 contacting the bracket 114 of the fixed part 110.

Here, the bracket 114 may include the sealing portion 114a sealing the interior space of the case 112 having the open bottom, and the protrusion portion 114b protruding in the outer radial direction from an outer end of the sealing portion 114a to be protruded to the outside of the case 112.

Accordingly, the fixed piece 146 of the substrate 140 may be coupled with the protrusion portion 114b, and the substrate 140 provided to the linear vibrator 100 according to the embodiment of the present invention fixed piecemay include the copper foil pattern portion 148 for the coupling of the fixed piece 146 and the protrusion portion 114b.

That is, since the substrate 140 provided in the embodiment of the present invention may be the flexible printed circuit board, the substrate 140 may be highly susceptible to heat.

Accordingly, in the related art, an adhesive has been used to couple the substrate to the protrusion portion of the bracket, and in this case, when an external impact is applied to the substrate, problems may arise in the linear vibration of the vibration part, due to a change in an initial position of the substrate.

In addition, the substrate may be deformed and damaged due to the heat required for curing the adhesive.

To overcome the above-described problems, fixation of the substrate 140 with the bracket 114 of the fixed part 110 may be secured, and the linear vibrator 100 according to the embodiment of the present invention may include the copper foil pattern portion 148 on the bottom surface of the fixed piece 146, so that the copper foil pattern portion 148 and the protrusion portion 114b of the bracket 114 are coupled.

That is, the copper foil pattern portion 148 provided on the bottom surface of the fixed piece 146 of the substrate 140 may be coupled to the protrusion portion 114b by solder (S) through soldering, and for the convenience of the soldering, the protrusion portion 114b of the bracket 114 may have the exposure hole 115 penetrating the top surface and the bottom surface thereof.

When the fixed piece 146 of the substrate 140 and the protrusion portion 114b are coupled, the exposure hole 115 may expose, to the outside, the copper foil pattern portion 148 provided on the bottom surface of the fixed piece 146.

Accordingly, the copper foil pattern portion 148 and a part of the protrusion portion 114b defining the exposure hole 115 may be tightly coupled by the solder (S) through soldering to thereby allow for tight coupling of the fixed piece 146 and the protrusion portion 114b.

However, various coupling methods other than the above-described coupling method through soldering between the copper foil pattern portion 148 and the protrusion portion 114b for coupling between the fixed piece 146 and the protrusion portion 114b, within a range which does not cause the deformation of the substrate 140, may be adopted.

That is, the copper foil pattern portion 148 provided on the fixed piece 146 and the protrusion portion 114b may be coupled by welding, and specifically, coupled by arc welding using heat generated by arc discharge, gas welding using a gas mixture of oxygen and acetylene, electron beam welding in which a high-speed electron beam is formed in a vacuum and the energy inherent in the electron flow is used as a welding heat source, laser beam welding which is performed by amplifying light in which a phase coincides as a single wavelength, friction welding using friction heat generated in a contact surface by causing a relative rotational movement, or the like.

Other than these, a coupling method using ultrasonic welding, pressure welding, high-frequency welding, or the like, may be used.

Further, the copper foil pattern portion 148 provided on the fixed piece 146 and the protrusion portion 114b may be coupled by bonding using an adhesive.

Here, the adhesive may be a UV bonding adhesive such as Loctite, LP163, LI504, or the like, and may be a metal bonding adhesive such as Loctite, epoxy, an adhesive only for UHU metal, or the like.

In addition, as for the coupling method between the copper foil pattern portion 148 of the fixed piece 146 and the protrusion portion 114b, at least two of the above-described coupling methods may be used simultaneously.

Since the fixed piece 146 and the protrusion portion 114b are coupled through the above-described coupling method, an initial position of the substrate 140 may not be changed, even in the case that an external impact is applied to the substrate 140. That is, there is no influence or changes with regard to vibration performance and characteristics of the linear vibrator 100 according to the embodiment of the present invention by the vibration of the substrate 140, that is, a vibrating component.

Here, cross-sectional shapes of the exposure hole 115 formed in the protrusion portion 114b and of the copper foil pattern portion 148 in the radial direction may not be limited to the rectangular shape shown in FIGS. 1 through 4, and a variety of shapes such as a polygonal shape, a circular shape, or the like, other than the rectangular shape, may be used.

In addition, the substrate 140 may include the connection piece 144 that connects the moving piece 142 and the fixed piece 146, and the connection piece 144 turns in the circumferential direction of the moving piece 142 to thereby enable the moving piece 142 to vibrate vertically, while retaining a predetermined clearance between an edge of the moving piece 142 from an end of the fixed piece 146.

In addition, an electrode pad 141 for transmitting an electrical signal having a specific frequency to the coil 132 may be provided on the bottom surface of the substrate 140, and the electrode pad 141 may be electrically connected with a withdrawal line of the coil 132.

Here, the electrode pad 141 may be formed on the outside of the outer diameter of the coil 132, and an end of the withdrawal line of the coil 132 may be electrically connected with the electrode pad 141 by the soldering.

Specifically, the electrode pad 141 may be formed on the bottom surface of the moving piece 142 of the substrate 140 to be coupled with the withdrawal line of the coil 132.

Accordingly, the withdrawal line of the coil 132 may be coupled with the electrode pad 140 on the outside of the coil 132, so there is no influence on vibrations and movement when the linear vibrator 100 according to the embodiment of the present invention is operated.

In addition, a damper 150 for preventing contact between the vibration part 130 and the bracket 114 of the fixed part 110 due to the vibrations of the vibration part 130 may be provided on the bottom surface of the moving piece 142.

The damper 150 may be formed of an elastic material to prevent contact due to the linear movement of the vibration part 130. Here, the damper 150 may prevent touch noise from being generated when the vibration part 130 is brought into contact with the bracket 114 due to excessive vibration thereof, and may prevent abrasion of the vibration part 130.

Here, in order to absorb an external impact when the external impact is applied, the damper 150 may be formed of a variety of materials capable of absorbing an impact, such as rubber, cork, propylene, poron, and the like.

Here, the damper 150 may be provided on the bottom surface of the moving piece 142 of the substrate 140 in FIGS. 1 through 4; however, without being limited thereto, the damper 150 may be provided on an inner sealing surface of an upper portion of the case 112 or on the top surface of the bracket 114.

Figure 5:
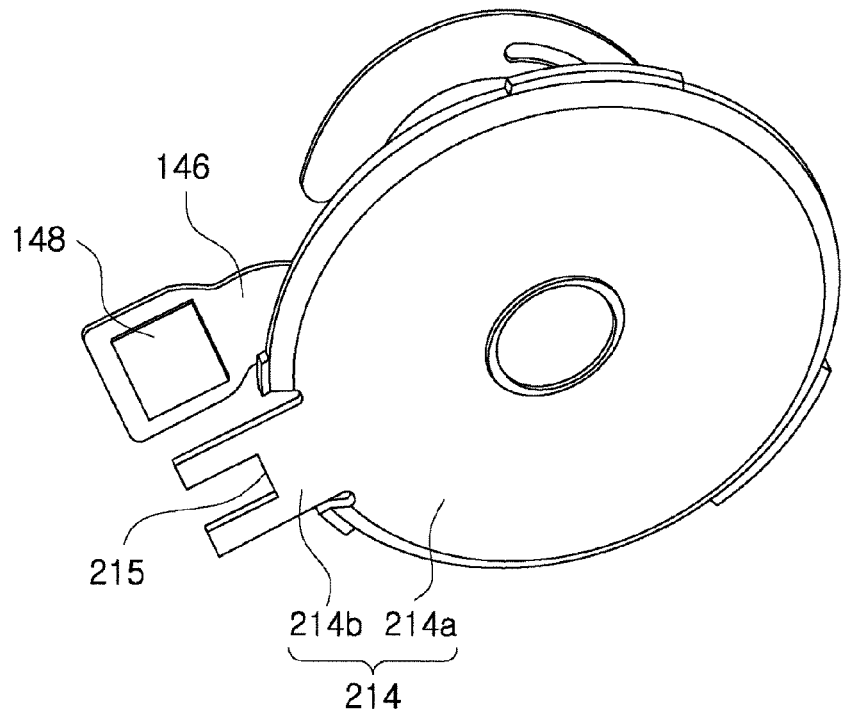
FIG. 5 is a schematic exploded perspective view illustrating a deformable bracket and a substrate provided to a linear vibrator according to an embodiment of the present invention.
Figure 6:
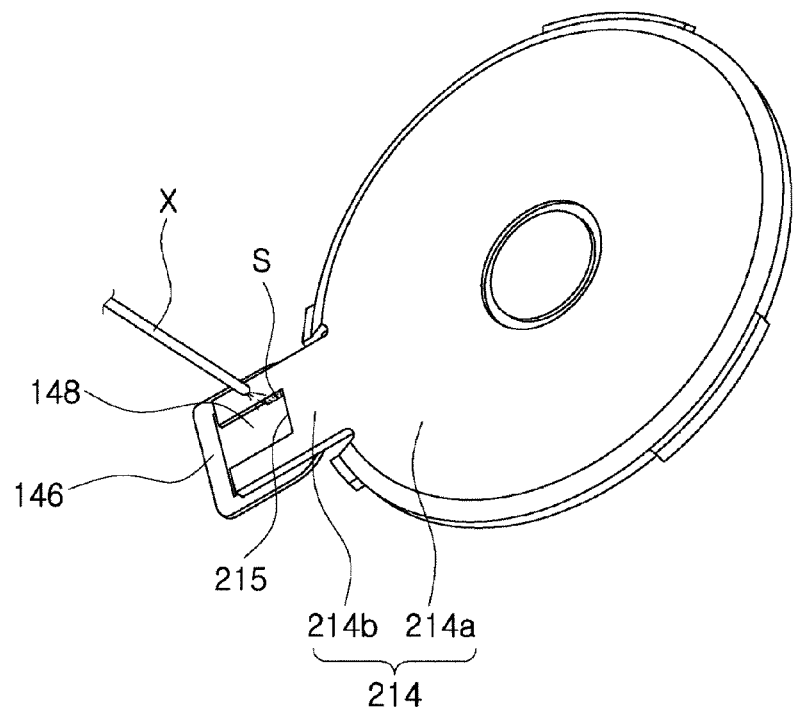
FIG. 6 is a schematic perspective view illustrating an assembling process between the bracket and the substrate of FIG. 5.

FIG. 5 is a schematic exploded perspective view illustrating a deformable bracket and a substrate provided to the linear vibrator according to an embodiment of the present invention, and FIG. 6 is a schematic perspective view illustrating an assembling process between the bracket and the substrate of FIG. 5.

Referring to FIGS. 5 and 6, a deformable bracket 214 provided to the linear vibrator 100 according to an embodiment of the present invention may include an exposure groove 215 allowing the copper foil pattern portion 148 provided on the bottom surface of the fixed piece 146 of the substrate 140 to be exposed to the outside.

The exposure groove 215 may be recessed inwardly in the inner radial direction from an outer end of the fixed part 110, i.e, an outer end of a protrusion portion 214b of the bracket 214 constituting the fixed part 110 by a predetermined depth.

Accordingly, the copper foil pattern portion 148 may be tightly coupled with a part of the protrusion portion 214b defining the exposure groove 215 by a solder (S) of soldering, whereby the coupling of the fixed piece 146 of the substrate 140 and the protrusion portion 214b may be secured.

In addition, the copper foil pattern portion 148 and a part of the protrusion portion 214b defining the exposure groove 215 may be coupled using a variety of welding or bonding methods described in FIGS. 1 through 4, other than soldering.

Here, a cross-sectional shape of the exposure groove 215 in the radial direction is not limited to the rectangular shape shown in FIGS. 5 and 6, and a variety of shapes such as a polygonal shape, a circular shape, or the like other than the rectangular shape may be used.

Figure 7:
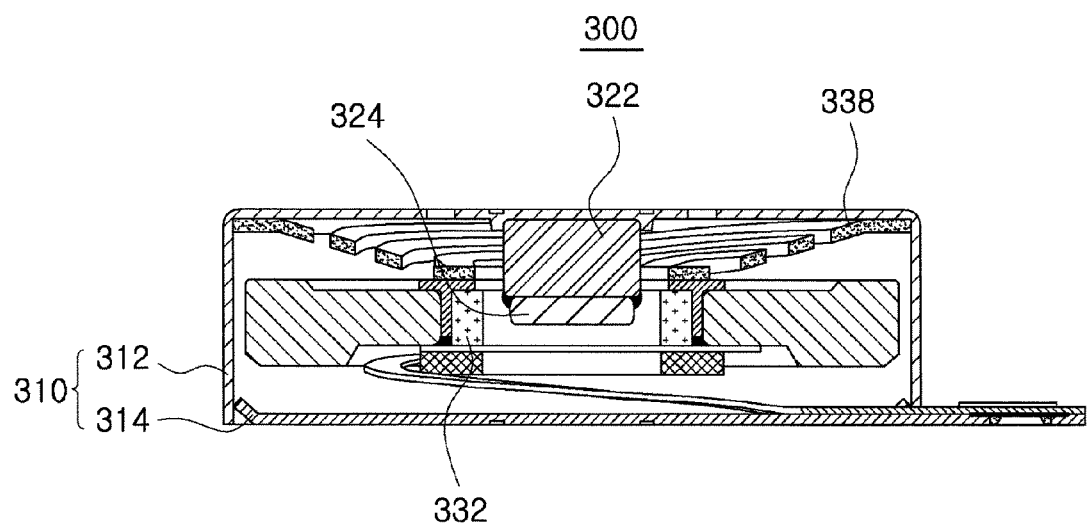
FIG. 7 is a schematic cross-sectional view illustrating a linear vibrator according to another embodiment of the present invention.

FIG. 7 is a schematic cross-sectional view illustrating a linear vibrator according to another embodiment of the present invention.

Referring to FIG. 7, a linear vibrator 300 according to another embodiment of the present invention may have the same configuration and effects as those of the linear vibrator 100 according to the previous embodiment of the present invention, except for the positions of a magnet 322 and a yoke plate 324, and thus, descripions other than the positions of the magnet 322 and the yoke plate 324 will be omitted.

The magnet 322 may be coupled to a fixed part 310, but may be coupled to an inner sealing surface of a case 312, rather than a bracket 314 of the fixed part 310, unlike the linear vibrator 100 according to the previous embodiment of the present invention.

Accordingly, an elastic member 338 may include a hole in the center formed to be larger than an outer diameter of the magnet 322 so as to prevent contact therewith at the time of vertical vibrations.

Here, the bottom surface of the magnet 322 may be coupled to the yoke plate 324 allowing magnetic flux to smoothly flow to the magnet 322 through a coil 332 generating electromagnetic force by interaction with the magnet 322.

Figure 8:
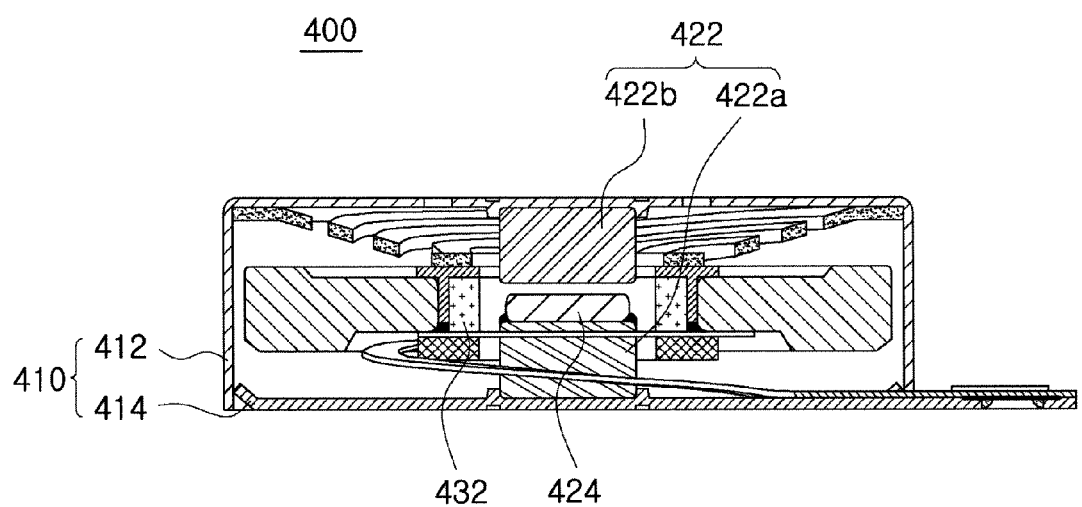
FIG. 8 is a schematic cross-sectional view illustrating a linear vibrator according to another embodiment of the present invention.

FIG. 8 is a schematic cross-sectional view illustrating a linear vibrator according to another embodiment of the present invention.

Referring to FIG. 8, a linear vibrator 400 according to another embodiment of the present invention may have the same configuration and effects as those of the linear vibrator 100 according to the previous embodiment of the present invention, except for a magnet 422, and thus, descriptions other than a description of the magnet 422 will be omitted.

The magnet 422 may include a first magnet 422a and a second magnet 422b.

The second magnet 422b may be formed in contact with an inner sealing surface of an upper portion of a case 412 of a fixed part 410, and the first magnet 422a may be coupled to a top surface of a bracket 414.

The first and second magnets 422a and 422b may be a cylindrical permanent magnet in which an upper portion and a lower portion of each of the first and second magnets 422a and 422b may be magnetized in the vertical direction as different poles so as to generate a magnetic field to thereby generate magnetic force having a predetermined strength. In addition, the first and second magnets 422a and 422b may be adhered via an adhesive or the like, to be fixedly disposed on the inner sealing surface of the upper portion of the case 412 and the top surface of the bracket 414.

The first and second magnets 422a and 422b may be positioned in a manner such that the same poles face each other to generate magnetic force, and may be spaced apart from each other.

By the first and second magnets 422a and 422b disposed in the manner such that the same poles face each other, lines of magnetic force existing between the first and second magnets 422a and 422b may be spread in the outer radial direction, thereby improving magnetic efficiency. In particular, magnetic force may be focused on a place in which a coil 432, positioned in the outer circumferential portion of the first and second magnets 422a and 422b, is linked, such that, if the same amount of current is consumed in the same volume, electromagnetic force may be greatly implemented in comparison with a single magnet, and a larger quantity of vibrations may be implemented.

However, the magnet 422 is not limited to being formed as the first and second magnets 422a and 422b, and two or more magnets may be provided as long as the polarities thereof can be disposed to face each other.

Here, the top surface of the first magnet 422a may be coupled to a yoke plate 424 allowing magnetic flux to smoothly flow to the first magnet 422a through the coil 432 generating electromagnetic force by interaction with the first magnet 422a.

However, the yoke plate 424 may be disposed between the first magnet 422a and the second magnet 422b.

Through the above-described embodiments, fixation between the substrate 140 and the fixed part 110, 310, and 410 may be maximized by the copper foil pattern portion 148 provided on the fixed piece 146 of the substrate 140 and the exposure hole 115 or the exposure groove 215 formed in the protrusion portion 114b of the bracket 114, 314, and 414 of the fixed part 110, 310, and 410, so that the initial position of the substrate 140 may not be changed even in the case that an external impact is applied to the substrate 140. That is, the vibration performance and characteristics of the linear vibrators 100, 300, and 400 according to the embodiments of the present invention are not affected by the vibration of the substrate 140 which is a vibrating component.

In addition, the linear vibrators 100, 300, and 400 according to the embodiments of the present invention may secure a maximal vibration quantity due to the maximization of magnetic efficiency, and obtain stable linear vibrations.

As described above, in a linear vibrator according to embodiments of the present invention, changes in the performance and characteristics of the vibrator due to a vibrating component may be prevented.

In addition, a maximal vibration quantity may be obtained by maximization in magnetic efficiency, and stable linear vibration may be realized.

In addition, magnetic efficiency may be increased with a reduction of occupied space.

While the present invention has been shown and described in connection with the embodiments, it will be apparent to those skilled in the art that modifications and variations can be made without departing from the spirit and scope of the invention as defined by the appended claims.

What is claimed is:

1. A linear vibrator, comprising:
   a fixed part providing an interior space having a predetermined size;
   at least one magnet disposed in the interior space and generating magnetic force;
   a vibration part including a coil facing the magnet and generating electromagnetic force through interaction with the magnet and a mass body; and
   a substrate having one end coupled to the vibration part to thereby serve as a free end, and the other end including a copper foil pattern portion coupled to the fixed part to thereby serve as a fixed end,
   wherein the fixed part includes an exposure hole penetrating a top surface and a bottom surface thereof or an exposure groove recessed from an outer end of the fixed part in order to allow the copper foil pattern portion to be exposed to the outside,
   the fixed part includes a case providing the interior space and having an open bottom, and a bracket sealing the interior space and having a protrusion portion protruding outwardly of the case,
   the exposure hole or the exposure groove is formed on the protrusion portion, and
   the copper foil pattern portion is coupled with a part of the protrusion portion defining the exposure hole or the exposure groove by soldering.

2. The linear vibrator of claim 1, wherein the copper foil pattern portion is formed on a surface of the substrate with which the fixed part is brought into contact.

3. The linear vibrator of claim 1, wherein the fixed part includes a case providing the interior space and having an open bottom, and a bracket sealing the interior space, and
   the magnet is coupled to a surface of the bracket or a surface of the case.

4. The linear vibrator of claim 1, wherein the fixed part includes a case providing the interior space and having an open bottom, and a bracket sealing the interior space, and
   the magnet includes a plurality of magnets respectively coupled to a surface of the bracket and a surface of the case.

5. The linear vibrator of claim 1, further comprising a yoke plate formed on at least one surface of the magnet and allowing magnetic flux to smoothly flow to the magnet through the coil.

* * * * *